United States Patent [19]

Shimada et al.

[11] 4,295,906

[45] Oct. 20, 1981

[54] METHOD FOR PRODUCING A MOTION PICTURE SCREEN

[75] Inventors: Wataru Shimada; Susumu Hoshinouchi; Kenji Kawaguchi; Akio Yoshida, all of Amagasaki, Japan

[73] Assignee: Mitsubishi Denki Kabushiki Kaisha, Tokyo, Japan

[21] Appl. No.: 125,744

[22] Filed: Feb. 28, 1980

[30] Foreign Application Priority Data

Mar. 27, 1979 [JP] Japan .................................. 54-36631

[51] Int. Cl.$^3$ ........................ G03B 21/56; G03B 21/60
[52] U.S. Cl. ..................................... 156/214; 83/861; 427/163
[58] Field of Search ................ 427/163; 156/212, 214; 83/861

[56] References Cited

U.S. PATENT DOCUMENTS 2,961,926 11/1960 Hoffmeister ......................... 350/293
3,263,561 8/1966 Jackson .............................. 350/293

Primary Examiner—James R. Hoffman
Attorney, Agent, or Firm—Wenderoth, Lind & Ponack

[57] ABSTRACT

In producing a motion picture screen from a workpiece by forming a surface with a number of continuously smoothly connected minute projections, a two-dimensional cutter which has a cutting edge constituted by a number of circular arcs connected together in a smooth wavy form lengthwise, each of the arcs having a predetermined curvature $\rho_1$ and a predetermined central angle $\theta_1$, and the centers of the neighboring arcs being on opposite sides of the cutting edge, is used to machine the surface of the workpiece by a relative movement between the workpiece and the cutter. A surface is machined that has in a section perpendicular to the length of the cutter a number of circular arcs connected together in a smooth wavy form lengthwise, each of the arcs having a predetermined curvature of $\rho_2$ and a predetermined central angle $\theta_2$ and the centers of the neighboring arcs being thus on opposite sides of the line. The workpiece thus machined can have aluminum, etc. applied to it by a vacuum evaporation process, etc. to be directly used as a motion picture screen. Alternatively, the machined workpiece can be used as a mould or die for producing a motion picture screen by pressing a metal foil having a high reflecting property, e.g. an aluminum foil, etc. against the machined surface, the foil forming the motion picture screen.

6 Claims, 8 Drawing Figures

METHOD FOR PRODUCING A MOTION PICTURE SCREEN

BACKGROUND OF THE INVENTION

The present invention relates to a method for producing a motion picture screen and more particularly to a method for producing a motion picture screen which makes it possible to provide easily and with accouracy a motion picture screen influenced little by surrounding light.

In motion picture screen technology many attempts have been made to provide a screen which is of high brightness. The brightness of a motion picture screen on its front surface has been increased in general by the use of various materials on the surface and treating it so as to have fine roughness so that a surface which can concentrate a quantity of light in a narrower angle range is obtained. A known surface having minute roughness utilizes random and fine surface roughness obtained by a rolling of a thin sheet, or one as shown in FIG. 1 of the attached drawings, wherein FIGS. 1a, b and c represent plan, cross-sectional and longitudinal sectional views, respectively. The screen shown in FIG. 1 has a surface which has a number of minute rugged elements, the reference 1 representing the surface thus formed.

As another, conventional, motion picture screen, also shown in FIG. 2 in perspective view there is known one wherein both sides including the reflecting surface 1 respectively have a number of rugged elements which orthogonally intersect each other, which elements can be machined using a conventional one-dimensional cutter. However, in the screens shown in FIGS. 1 and 2, since the rugged elements of the reflecting surface 1 have respectively an irregular shape, and the adjoining elements are not connected by a smooth surface, there being acute angle portions therebetween, the directional reflection quality is inferior, resulting in a decrease in contrast and colour reproduction when a projector having a low light intensity is used, or the screen is used under circumstances which allow light to be projected onto the periphery thereof. Therefore, conventional motion picture screens have a defect that in order to be used most effectively they must be used in a substantially dark environment.

Motion picture screens of this kind or the like are also disclosed in the following U.S. patents. In U.S. Pat. No. 3,263,561 to J. G. Jackson high light reflecting screens are disclosed which comprise a plurality of individual substantially rectangular main reflectors which together form a reflecting surface for the screen, each of the main reflectors being curved from the four sides thereof towards the center out of the general plane of the reflecting surface. However, nothing is referred to therein as to the use of a two-dimensional cutter as well as the carrying out of a relative movement between it and a workpiece when the screen is to be produced from the workpiece with its surface being machined by the cutter.

Further, in U.S. Pat. No. 2,961,926 reflective devices having multi-curved surfaces are disclosed, and they are said to be produced by the use of a board provided with a lower edge shaped according to a wavy line. Although this board resembles the two-dimensional cutter used in the present invention the reflective devices of this U.S. Patent are not a motion picture screen, and the configuration of their waved surface does not substantially conform to that of the screen surface produced by the method according to the present invention.

SUMMARY OF THE INVENTION

It is a principal object of the present invention to provide a method for producing easily and accurately motion picture screen having excellent directional reflecting properties.

According to the present invention a method for producing a motion picture screen is provided wherein the screen surface is machined by relative motion between a two-dimensional cutter and a workpiece from which the screen is produced such that the configurations of the machined surface in sections parallel with the X-Z and Y-Z planes when the workpiece is assumed to be laid on the X-Y plane in a space co-ordinate system comprise respectively a number of circular arcs connected together in a smooth wavy shape, each of the arcs having respectively a predetermined curvature ($\rho_1$, $\rho_2$) and a predetermined center angle ($\theta_1$, $\theta_2$) and the centers of the neighbouring arcs being positioned on opposite sides by the surface.

In accordance with a preferred embodiment of the present invention the cutting edge of the two-dimensional cutter comprises a number of circular arcs each having a predetermined curvature of $\rho_1$ and a center angle of $\theta_1$, the centers of the neighbouring circular arcs being positioned oppositely with regard to them.

In accordance with another embodiment of the present invention the relative motion between the two-dimensional cutter and the workpiece is such that, for example, the cutting edge of the cutter is reciprocated in a direction perpendicular to its length for a predetermined stroke and simultaneously the workpiece is moved in a direction perpendicular to the reciprocating direction of the cutter at a substantially constant velocity so that the machined surface of the workpiece has contours in sections parallel with and perpendicular to the direction of the reciprocating movement of the cutter that comprise respectively a number of circular arcs connected together in a smooth wavy shape, each of the arcs having respectively a curvature of $\rho_1$, $\rho_2$ and a predetermined center angle of $\theta_1$, $\theta_2$, the centers of the neighbouring circular arcs being positioned on opposite sides of the surface.

BRIEF DESCRIPTION OF THE DRAWINGS

Other objects and advantages of the present invention will become apparent from the following description taken in connection with the accompanying drawings wherein are set forth by way of illustration and example certain embodiments of the present invention;

FIG. 1b is a cross sectional view of the screen shown in FIG. 1a;

FIG. 1c is a longitudinal sectional view of the screen shown in FIG. 1a;

DESCRIPTION OF THE PREFERRED EMBODIMENTS

Figure 1A:
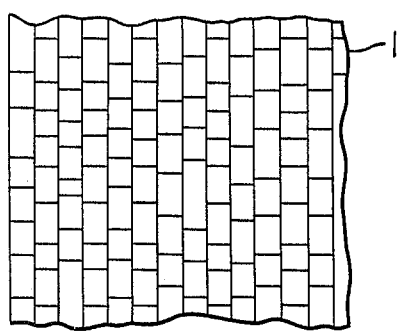
FIG. 1a is a plan view of one example of a conventional motion picture screen.
Figure 1C:
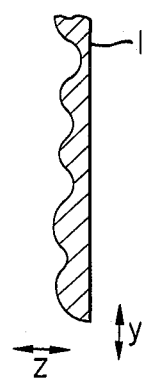
Figure 2:
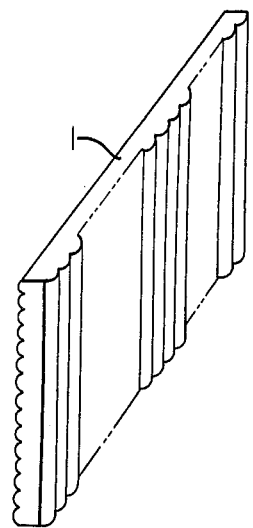
FIG. 2 is a perspective view of another example of a conventional motion picture screen.
Figure 1B:
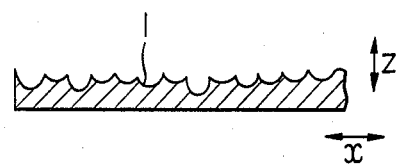
Figure 3:
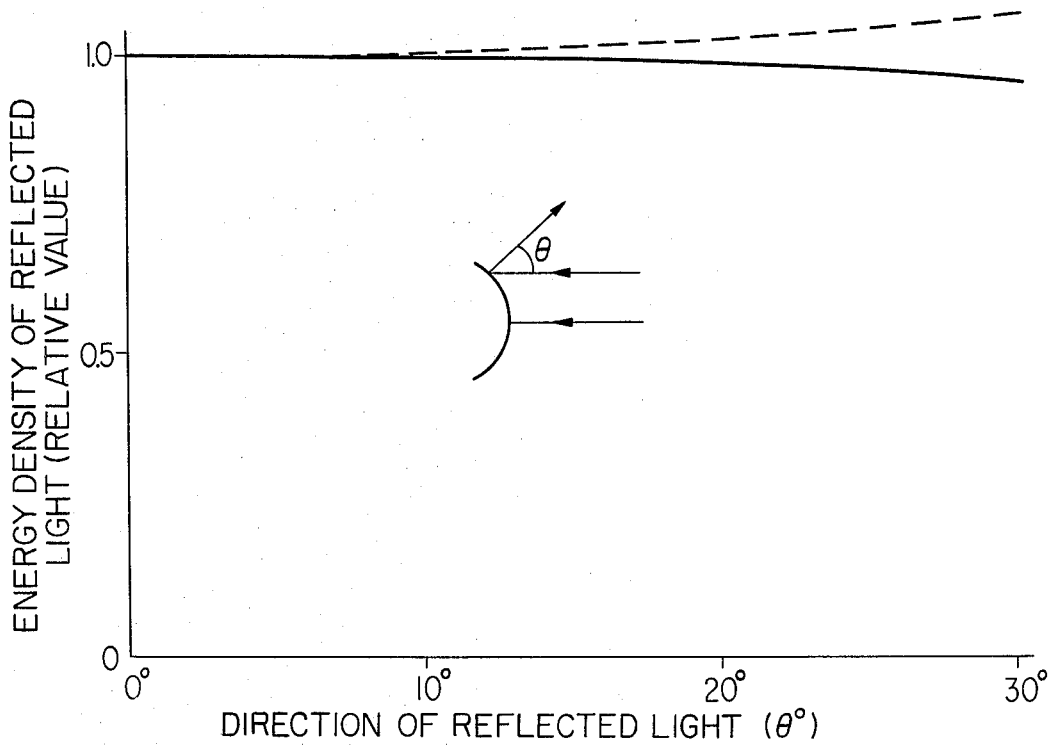
FIG. 3 is a diagram showing the relation between the reflection energy density and the direction of the reflected light when a cylindrical surface is used as a minute element comprising the screen.

The present invention has been arrived at on the basis of the information that, as shown in FIG. 3 in which the relation between the reflection energy density and the direction of the reflected light is shown by a dash line and a solid line for an element having a paraboloidal form and an element having a cylindrical form, respectively, in contrast with elements having such rugged forms as shown in FIGS. 1 and 2. If an element having a cylindrical form is used, the directional quality of the reflection is remarkably increased and the light energy is effectively utilized so that the brightness is made high and the screen is made less susceptible to the influence of surrounding light.

On the basis of such information, according to one embodiment of the present invention, a motion picture screen is produced by means of a two-dimensional cutter 2 as shown in FIG. 4 which may be machined by a wire cutting electrical discharging process, or a laser machining process, or the like such that, when the two-dimensional cutter is assumed to be laid on the X-Z plane in a space coordinate system, its cutting edge comprises a number of circular arcs connected together in a smooth wavy shape lengthwise, each of the arcs having a predetermined curvature of $\rho_1$ and a predetermined center angle of $\theta_1$, and the neighboring arcs having their centers located oppositely with regard to them. Thus, the cutting edge has a wavy configuration lengthwise thereof and $1/\rho_1$ and $\theta_1$ may be e.g. 1.5 mm and 30°, respectively.

Figure 4B:
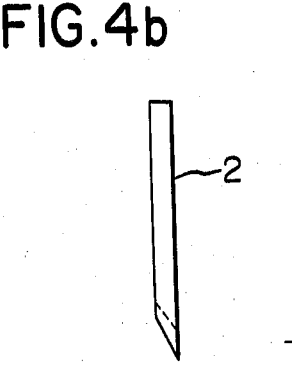
FIG. 4b is a side elevational view of the cutter shown in FIG. 4a viewed from the righthand side.
Figure 4A:
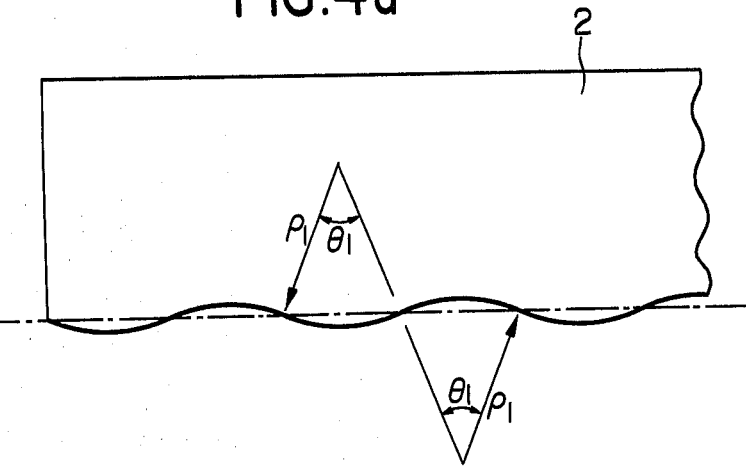
FIG. 4a is a front elevational view of an embodiment of the two-dimensional cutters used in carrying out the method for producing a motion picture screen according to one aspect of the present invention.
Figure 5:
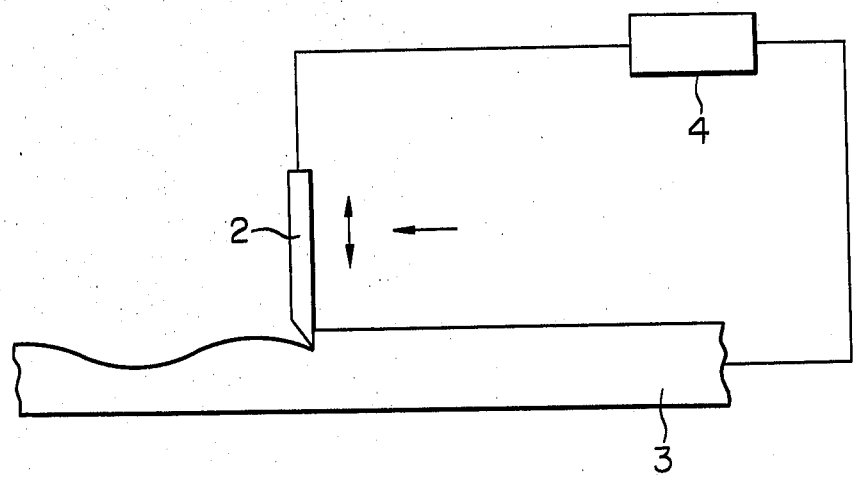
FIG. 5 is an explanatory view to show relative motion taking place between the two-dimensional cutter shown in FIGS. 4a and 4b and a workpiece when the cutter machines the workpiece in accordance with the present invention.

According to the present invention the motion picture screen is produced from a workpiece, preferably having a plate-like form, by machining it with a two-dimensional cutter 2 as shown in FIGS. 4a and 4b. FIG. 5 shows the state of the workpiece 3 in the course of its being machined by cutter 2. As symbolically shown in FIG. 5, interposed between the two-dimensional cutter 2 and workpiece 3 is a control mechanism 4 which acts to generate relative motion between cutter 2 and workpiece 3 as follows:

Assuming that cutter 2 and workpiece 3 are placed in the X-Z and X-Y planes, respectively, in a space coordinate system as shown in FIG. 5, and cutter 2 is reciprocated in the Z-direction through a predetermined constant stroke and workpiece 3 is moved in the Y-direction at a substantially constant speed, the surface of workpiece 3 is machined so as to have a configuration such that when it is cut by a plane parallel with the Z-Y plane, a contour is revealed which comprises a number of circular arcs connected together in represent a smooth wavy shape lengthwise, each of the arcs having a predetermined curvature $\rho_2$, e.g. $1/\rho_2$ being 5 mm, and a predetermined center angle $\theta_2$, e.g., 10°, the centers of the adjoining circular arcs being located on opposite sides of the contour.

Figure 6:
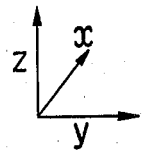
FIG. 6 is a diagram showing the locus of the movement of the cutting edge of the cutter moved in the direction of the movement of the workpiece when it is machined during the relative movement as explained in FIG. 5.
Figure 6:
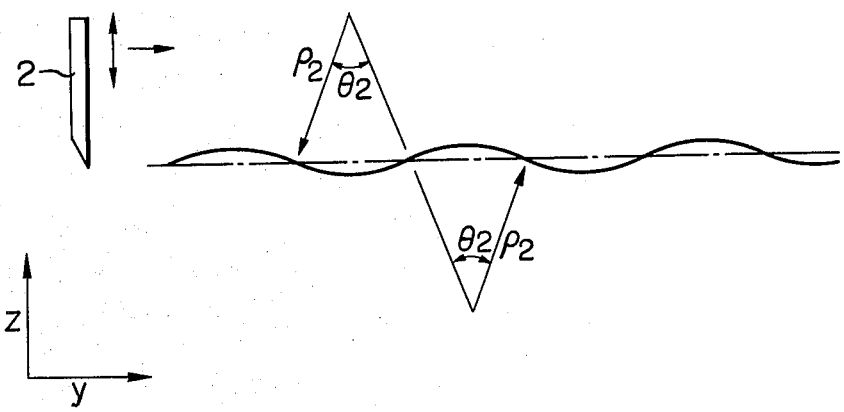
Figure 7:
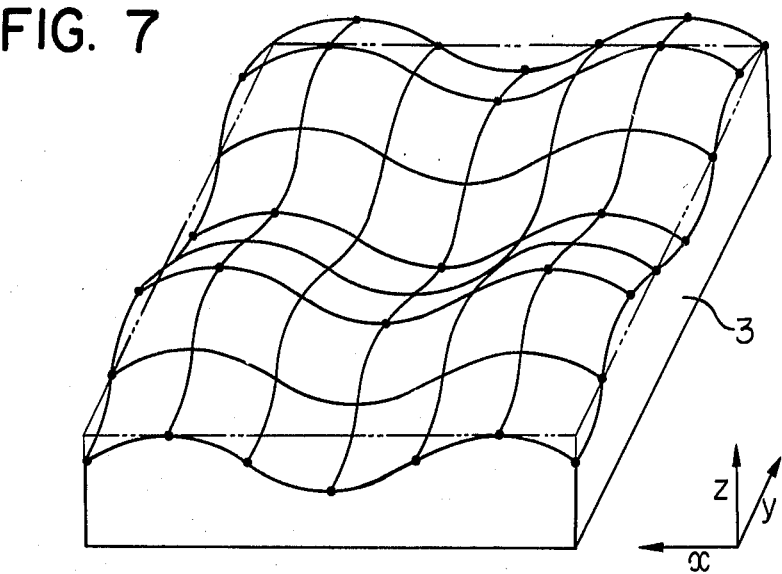
FIG. 7 is a perspective view of the rugged surface of a motion picture screen produced by the method according to the present invention.

FIG. 7 is a perspective view of a portion of the surface of workpiece 3 which has been machined by the use of the two-dimensional cutter 2 shown in FIG. 4 with the relative motion between it and workpiece 3 taking place as explained above in conjunction with FIGS. 4a to 6. In FIG. 7, solid lines show the contours on the front surface.

As is apparent from FIG. 7, since the surface of workpiece 3 comprises smooth wavy lines in sections parallel with both the X-Z and Y-Z planes, respectively, each having an excellent directional reflection property as is clear from FIG. 3, a motion picture screen having high brightness and little susceptibility to the influence of the surrounding light is provided.

When the material used for workpiece 3 is one having an excellent reflection property, e.g. an aluminum plate, or one having excellent machinability, e.g. a synthetic resin plate with aluminium, etc. applied on the machined surface by a vacuum evaporation process, etc., the machined workpieces can be used as motion picture screens as they are. Further, the workpiece thus machined can be used as a mould or die by pressing a thin material having an excellent reflection property, e.g. an aluminium foil on it, or a thermosetting synthetic resin is put on it so as to transcribe the machined surface and the transcribed surface has aluminium, etc. applied by a vacuum evaporation process, etc. Thus, motion picture screens having excellent characteristics as described above can be produced in large quantities with accuracy and yet at a low price.

If a transparent material is used as the workpiece, a penetration type motion picture screen can be obtained.

Although the embodiments described above are plane motion picture screens, if after the screen surface is machined by the process as shown in FIGS. 5 and 6 so as to obtain a surface as shown in FIG. 7, the plane surface is deformed, a screen having a spherical form at least in one direction may, of course, be obtained.

Figure 8A:
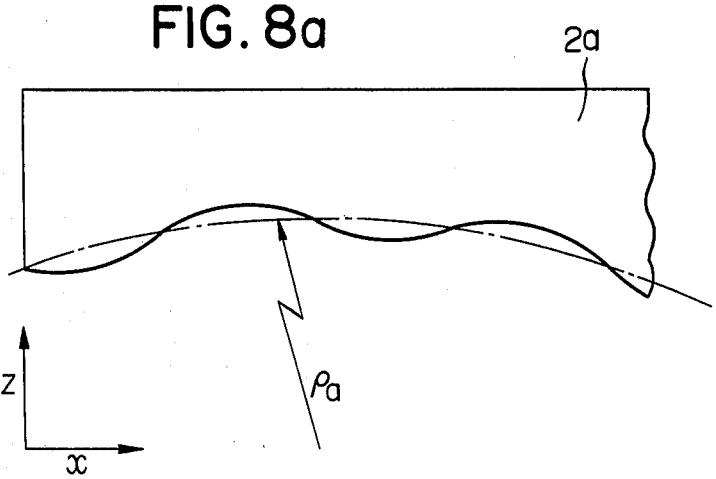
FIG. 8a is a front elevational view of another embodiment of the cutter which can be utilized in carrying out the method for producing a motion picture screen according to another aspect of the present invention.
Figure 8B:
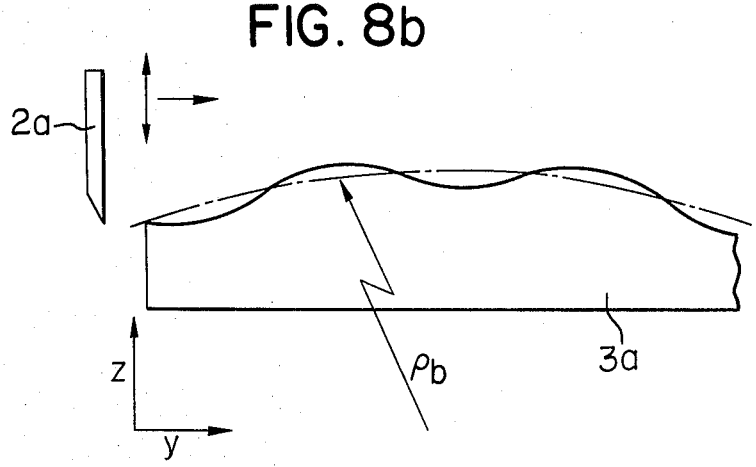
FIG. 8b is a diagram showing the locus of the cutting edge of the cutter shown in FIG. 8a moved in the direction of the movement of the workpiece when it is machined by the cutter during the relative movement therebetween.

Further, also, a motion picture screen having an arcuate surface at least in one direction can be obtained either, as shown in FIG. 8a, by making the center line for the circular arc elements of the cutting edge of a two-dimensional cutter 2a a curve having a curvature of $\rho_a$ as shown by the dot-and-dash line, or, as shown in FIG. 8b, by transforming the reference line for the relative motion between two-dimensional cutter 2a and workpiece 3 into a curve having a curvature of $\rho_b$ as shown by the dot-and-dash line.

From the foregoing it will be appreciated that, according to the present invention, since the screen surface is machined so that it comprises a smooth continuous surface by introducing a relative motion between a workpiece and a two-dimensional cutter having smooth connected circular arcs, a motion picture screen having high brightness and low susceptibility to the influence of the surrounding light can be produced easily and with accuracy.

What is claimed is:

1. A method for producing a motion picture screen comprising the steps of preparing a two-dimensional cutter the cutting edge of which comprises a number of circular arcs, connected together in a smooth wavy line, in the X-Z plane in a space coordinate system, each of said arcs having a predetermined curvature and a predetermined center angle, and the centers of the neighbouring ones of said circular arcs being located on opposite sides of said line, placing a workpiece from which said motion picture screen is to be produced and said two-dimensional cutter in the X-Z and X-Y planes, respectively, and machining the surface of said workpiece by said two-dimensional cutter while moving said workpiece and said cutter for producing a relative motion therebetween for forming a machined surface which comprises smooth connected wavy curves in sections parallel with both the X-Z and Y-Z planes, said curves respectively comprising a number of circular arcs, each of said last mentioned circular arcs having a predetermined curvature and a predetermined center angle, and the centers of the neighbouring ones of said circular arcs being positioned on opposite sides of said curves.

2. A method for producing a motion picture screen as claimed in claim 1, wherein said workpiece has an excellent reflection property and good machinability, and said method further comprises applying a reflecting material on the machined surface of said workpiece by a vacuum evaporation process.

3. A method for producing a motion picture screen as claimed in claim 1, further comprising pressing a foil of excellent reflective properties against the machined surface of said workpiece for obtaining said screen.

4. A method for producing a motion picture screen as claimed in claim 1, wherein, after said workpiece is machined the the method further comprises applying thermosetting synthetic resin thereon, and then applying to the thus shaped resin a material of excellent reflective properties by a vacuum evaporation process.

5. A method for producing a motion picture screen as claimed in claim 1, wherein the material of said workpiece is a material which allows the light to penetrate therethrough.

6. A method for producing a motion picture screen as claimed in claim 1, wherein said circular arcs of said cutting edge lie along a center line which is curved, whereby said workpiece has a generally arcuate surface at least in one direction.

* * * * *